United States Patent Office 3,449,290
Patented June 10, 1969

3,449,290
SILICONE ELASTOMER COMPOSITIONS CONTAINING POWDERED POLYTETRAFLUOROETHYLENE
William W. Foster, Grand Island, N.Y., assignor to Union Carbide Corporation, a corporation of New York
No Drawing. Filed July 12, 1966, Ser. No. 564,542
Int. Cl. C08g 47/10
U.S. Cl. 260—37    9 Claims

ABSTRACT OF THE DISCLOSURE

A composition of matter comprising: (a) a dihydrocarbon substituted polysiloxane gum, said hydrocarbon groups being methyl and vinyl radicals; (b) an alkoxy or hydroxy end-blocked polysiloxane fluid; (c) polytetrafluoroethylene; (d) a reinforcing silica filler; and (e) an extending silica filler, as well as the process of improving the physical properties of said composition by subjecting it to a shearing action of at least thirty minutes; the cured products of said composition being excellent siloxane elastomers.

---

This invention relates in part to improvements in the processing properties of polysiloxane compositions containing polytetrafluoroethylene. More particularly, the invention relates to novel curable compositions of matter comprising a polysiloxane gum, polytetrafluoroethylene, an end-blocked polysiloxane oil and a mixture of reinforcing and extending fillers, which are characterized by improved physical processing properties and to the cured elastomers prepared therefrom. The invention is also concerned with a process for preparing such novel compositions which includes the step of subjecting the mixture of polysiloxane gum, polysiloxane oil, reinforcing filler and extending filler to a severe and prolonged shearing action.

Curable or vulcanizable mixtures of a polysiloxane gum and solid polytetrafluoroethylene are known to provide elastomeric compositions having desirable physical properties. By way of illustration, U.S. Patent No. 2,710,290 to M. M. Safford and A. M. Bueche discloses curable mixtures of a polysiloxane gum and solid polytetrafluoroethylene with a filler which, after subjected to a shearing deformation and massaging action and converted to an elastomer, provides marked improvements in tear strength as well as desirable levels of tensile strength and elongation. While such physical properties would normally lend the mixtures to a variety of applications, they have not met with wide commercial acceptance due to the difficulties encountered in compounding procedures necessary for their production. For example, on compounding they become tough and wax-like and are most difficult to mill. More specifically, it has been found that such mixtures tend to slip over and even off the surfaces of milling rolls and hence do not readily pass through the bite therebetween. They are also not readily manageable on other conventional rubber fabricating equipment as for example an extruder where problems are encountered in forcing such mixtures through a screen pack or in molding apparatus where compression molding has been carried out only with some difficulty. Furthermore, continued working or milling of these mixtures does not appear to improve their processing properties. In one experiment it was found that milling of such mixtures for periods up to three hours failed to provide noticeable improvements in their toughness and slipping tendencies. As a further result the addition to and uniform dispersion of curing catalysts to these mixtures becomes most difficult.

The present invention is based on the discovery that readily workable or processable mixtures of a polysiloxane gum and polytetrafluoroethylene are obtainable by adding thereto certain amounts of a specific type of an end-blocked polysiloxane oil, a reinforcing silica filler and an extending silica filler and by subjecting the resulting mixture to a severe and prolonged shearing action. According to my findings such compositions become as readily workable as conventional polysiloxane gum compositions and at the same time possess physical properties of the same magnitude as those which characterize the heretofore down polytetrafluoroethylene-modified polysiloxane gum compositions. To obtain the benefits of the present invention it is critical that the shearing action to which the mixture of polysiloxane gum, polysiloxane oil, reinforcing silica filler and extending silica filler is subjected is both severe and at the same time carried out for periods of at least thirty minutes and preferably for periods of at least forty-five minutes. By so doing there is obtained a polytetrafluoroethylene modified polysiloxane gum composition that is soft, plastic and easily workable, into various forms, and which can be cured to extremely desirable silicone elastomers.

The reasons why the mixture of components which comprise my novel compositions provide the highly desirable results referred to above are not fully known or completely understood. This is particularly the case when the effect of a continued shearing action on prior art polytetrafluoroethylene-polysiloxane gum compositions (as noted above) is compared with the effect of this same action on the composition of the present invention. Moreover, the omission of either the end-blocked polysiloxane oil, the reinforcing filler or the extending filler from my novel compositions result in an unexplainable and remarkably noticeable decrease in the processing properties of the compositions.

The polysiloxane gums which can be employed in combination with solid polytetrafluoroethylene and the other ingredients to prepare the improved compositions of the present invention are the dihydrocarbon substituted polysiloxane gums whose hydrocarbon substituents comprise saturated hydrocarbon groups of one or more types and olefinically-unsaturated hydrocarbon groups of one or more types. In the production of the improved compositions, the hydrocarbon-substituted polysiloxane gums can be employed entirely as linear polysiloxane, or, they may be employed partly as linear polysiloxanes and partly as cyclic polysiloxanes. When the olefinically-unsaturated hydrocarbon substituents are present in a linear polysiloxane, they are preferably present in limited, predetermined numbers, and they are disposed at spaced intervals along the linear polysiloxane chains. Such linear polysiloxanes can be prepared by copolymerization or coequilibration methods as well as by blending methods. Thus, for example, they may be prepared (1) by hydrolysis methods involving cohydrolysis of predetermined proportions of one or more dihydrocarbon-substituted dihalo- or dialkoxysilanes whose hydrocarbon substituents comprise one or more types of saturated hydrocarbon groups with one or more dihydrocarbon disubstituted dihalo- or dialkoxysilanes whose hydrocarbon substituents comprise one or more types of olefinically-unsaturated hydrocarbon groups, or (2) by coequilibration of predetermined proportions of one or more low molecular weight cyclic, hydrocarbon-substituted polysiloxanes whose hydrocarbon substituents comprise one or more types of saturated hydrocarbon groups with one or more low molecular weight cyclic hydrocarbon-substituted polysiloxanes whose hydrocarbon substituents comprise one or more types of olefinically-unsaturated hydrocarbon groups. Blending to achieve the effect of utilizing a linear hydrocarbon-substituted polysiloxane chain having both saturated and olefinically-unsaturated hydrocarbon substituents may be carried out. Thus, for example, they may be prepared by mechanically mixing one or more low molecular weight dihydrocarbon-substituted polysiloxanes whose hydrocarbon substituents comprise both saturated and olefinically-unsaturated hydrocarbon groups, which polysiloxanes contain at least two olefinically-unsaturated hydrocarbon groups to the molecule, with one or more types of linear polysiloxanes whose hydrocarbon substituents comprise saturated hydrocarbon groups. Such blends can also be prepared by mechanically mixing one or more linear polysiloxanes whose hydrocarbon substituents comprise one or more types of olefinically-unsaturated hydrocarbon groups in relatively small proportion with one or more linear polysiloxanes whose hydrocarbon substituents comprise one or more olefinically-unsaturated hydrocarbon groups in relatively large proportion.

I prefer to employ as the polysiloxane gum component, hydrocarbon-substituted polysiloxanes whose one or more saturated hydrocarbon groups consist of types selected from the class consisting of alkyl and aryl groups as for example methyl, ethyl, and phenyl groups and whose one or more olefinically-unsaturated hydrocarbon groups consist of types selected from the class consisting of vinyl, allyl, and cyclohexenyl groups. The saturated hydrocarbon groups can be present as both of the hydrocarbon substituents of disubstituted siloxane units, or as single hydrocarbon substituents of disubstituted siloxane units, the other hydrocarbon substituents of which are olefinically-unsaturated hydrocarbon groups.

In practicing the invention, I can employ olefinically-unsaturated hydrocarbon-containing polysiloxane gums comprising or consisting of relatively short chain, low molecular weight linear polysiloxanes of chain lengths falling within a limited range, which gums are pourable liquids, or, I can employ siloxane gums of the same composition having higher viscosities, relatively longer chain lengths and relatively high molecular weights up to the point at which the viscosity of the gum is such that it approaches the solid state and will barely flow when unconfined. Such polysiloxane gums have a miniature pentrometer value (hereinafter defined) of from about 30 to 150. The preferred gums will have a value of from about 60 to 80.

In the practice of my invention the end-blocked polysiloxane oils employed are those relatively low molecular dihydrocarbon substituted polysiloxanes having at least one end-blocking group selected from the class consisting of alkoxy and hydroxyl groups. Such polysiloxanes may be graphically depicted by the structural formula

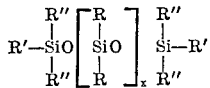

wherein R represents a monovalent hydrocarbon group as for example alkyl, cycloalkyl, alkenyl and aryl groups, R″ represents either a monovalent hydrocarbon group as R or a hydroxyl or an alkoxy group, R′ represents either an alkoxy or hydroxyl group and $x$ is a number having an average value of from about 4 to about 35. It should be noted that one of the two R′ groups can also represent a hydrocarbon group as R. Typical of the hydrocarbon groups represented by R are methyl, ethyl, propyl, phenyl, ethyl phenyl, phenylethyl, vinyl, allyl and the like. Typical of the alkoxy groups represented by R′ are the methoxy, ethoxy and propoxy groups. The preferred end-blocked polysiloxane oils are the dimethyl polysiloxanes having an average one ethoxy group or one hydroxyl group per terminal silicon atom thereof.

Hydroxyl and alkoxy end-block polysiloxane oils of the type described are well known and can be prepared by any suitable process. For example, hydroxyl end-blocked dimethyl polysiloxane oils can be prepared heating a mixture of the cyclic tetramer of dimethylsiloxane with water in the presence of a catalyst such as ammonium hydroxide. An ethoxy end-blocked dimethylpolysiloxane oil can be prepared by equilibrating dimethyldiethoxysilane with the cyclic tetramer of dimethylsiloxane in the presence of an alkaline catalyst. For the most part the end-blocked dihydrocarbon substituted polysiloxane oils are employed in amounts of from about 2 to 100 and preferably from 10 to 60 parts by weights per 100 parts by weight of the dihydroxycarbon substituted polysiloxane gum.

The reinforcing silica fillers which can be employed in the practice of my invention are precipitated silica and fumed silica. Such materials are generally referred to as "silica fillers of the highly reinforcing type" and are characterized by nominal particle of from about 5 to about 50 millimicrons and by surface areas of from about 80 to about 600 square meters per gram. Preferred are those reinforcing silicas having a nominal particle of from about 10 to about 20 millimicrons and a surface area of from about 100 to about 350 square meters per gram. Typical of such fillers which are commercially available are those sold under the trade names of "Santocel CS," Degussa Aerosil, Cab-O-Sil MS–5 and Cab-O-Sil HS–5. The reinforcing silica filler must be present in the novel compositions in an amount of at least 10 parts by weight per 100 parts by weight of the dihydrocarbon-substituted polysiloxane gum. For the most part greater amounts of the reinforcing silica filler will be employed. In most instances such filler will be present in amounts of from about 20 to about 75 parts by weight per 100 parts by weight of the dihydrocarbon substituted polysiloxane gum.

The extending silica fillers which can be employed in the practice of my invention include, among others, pulverized quartz, diatomaceous earth and the like. Such materials are generally characterized by nominal particle diameters of from about 0.1 to 50 microns and by surface areas of less than about 30 square meters per gram. Preferred extending silica fillers are those having a nominal particle diameter of from about 1 to about 10 microns. Typical of fillers which are commercially available are those sold under such trade names as Min-U-Sil (pulverized quartz) Celite 270 and Celite 350 (diatomaceous earths). The extending silica filler is employed in amounts of from about 10 to about 250 parts, preferably from about 30 to 150 parts, by weight per 100 parts by weight of the dihydrocarbon substituted polysiloxane.

Polytetrafluoroethylene is employed in preparing the compositions of the present invention in the form of solid particles or granules. The polymer can be added to the dihydrocarbon substituted polysiloxane as a dry powder or it can be dispersed in water and the dispersion added to the gun during a milling operation. In the practice of my invention, polytetrafluoroethylene is employed in amounts by weight of up to 25 parts per 100 parts of the dihydrocarbon substituted polysiloxane gum. I prefer to employ polytetrafluoroethylene in amounts of from about 5 to about 15 parts by weight per 100 parts by weight of the dihydrocarbon substituted polysiloxane gum. Polytetrafluoroethylene is available commercially under the tarde name Teflon in the form of particles having a nominal diameter of from about 0.15 to about 100 microns.

The prolonged and severe shearing action which is applied to my compositions can be provided through the use of rubber compounding mills which are so designed as to have differential rolls operating at different speeds. It can also be provided by the use of intensive mixers such as the Banbury mixer. Thus, one method for carrying out my process includes the step of admixing the dihydrocarbon substituted polysiloxane gum, the end-blocked dihydrocarbon substituted polysiloxane oil, the extending and reinforcing fillers on a rubber mill and thereafter adding polytetrafluoroethylene powder to the resulting mixture while continuing the milling operation. While the order in which the components are added to the mill is not critical, I have found it expedient to add the polytetrafluoroethylene last. The shearing action provided by the rolls of the mill is continued for at least 30 minutes and preferably longer. Initially polytetrafluoroethylene-containing composition behaves much like those prior compositions referred to above. As a result of the prolonged and severe shearing action the composition becomes soft plastic and readily workable. The composition can be readily molded or formed into desired shapes and cured to elastomers of outstanding and desirable physical properties.

Elastomeric materials can be prepared by admixing an organic peroxide with my novel composition during the last stages of the milling operation. It has been found that such compositions readily accept organic peroxides. That is to say, the organic peroxide can be easily and thoroughly dispersed within the novel compositions—a step not characteristic of earlier polytetrafluoroethylene-modified compositions. Suitable for use are the dialkyl-, the acyl-, the mixed alkylacyl-, the chloroacyl- and the like peroxides. Typical of such peroxides are di-tertiary-butyl peroxide, tertiary-butyl-triethylmethyl peroxide, tertiary-butyl-tertiary-triptyl peroxide, dicumyl peroxide, benzoyl peroxide, tertiary-butyl perbenzoate, 1,4- and the 2,4-dichlorobenzoyl peroxides, monochloro benzoyl peroxide, 2,5-dimethyl-2,5-t-butyl peroxy hexane and the like.

The amount of organic peroxide employed in producing the elastomers of this invention is not narrowly critical and can vary over a wide range. I can employ from as little as 0.1 to as much as 2.5 and more parts by weight of the organic peroxide per 100 parts by weight of the dihydrocarbon substituted polysiloxane gum. Preferably, I employ from about 0.5 to about 2 parts by weight of the catalyst per 100 parts by weight of the gum.

The following examples described the improved compositions and elastomers of my invention as well as the novel process for obtaining the same. In the examples all parts are by weight and the following terms and expressions where employed are to be interpreted as indicated below.

GLOSSARY (A) Miniature penetrometer.—The miniature penetrometer used in determining the hardness of silicone gums is a modification of the standard miniature penetrometer used in measuring the hardness or viscosity of a plastic substance, such as asphalt, made in accordance with suggestions contained in the article "Miniature Penetrometer for Determining the Consistency of Lubricating Grasses" by Kaufman, Gus; Finn, W. J. and Harrington, R. J., Industrial and Engineering Chemistry, Analytic Edition, 11, 108–110 (1939).

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

Silicone gum is tested for hardness by lowering the penetrometer cone with the plunger into contact with the surface of the gum with the indicator reading zero. Then the penetrometer cone with its plunger is released to permit downward movement under the influence of gravity for a period of 10 seconds, and the depth of penetration is shown in millimeters on an indicator associated with the device. The indicated penetration is identified as the miniature penetrometer reading (MPR).

(B) Elongation.—Amount of stretch of a sample under a tensile force expressed as a percentage of the original length.

$$\frac{\text{(Stretched length} - \text{original length)}}{\text{original length}} \times 100$$

(C) Hardness.—Degree of indentation produced by a plunger or indentor under a specific load. Measured with a Short A durometer. The values ranges from 0 to maximum hardness of 100.

(D) Tear strength.—Similar to a tensile test, except that a different right angle or C dumbbell shape having a notch in its side is used. Sample tears at the right angle. Force required to tear specimen divided by thickness is tear strength (lb./in.).

(E) Tensile strength.—The force necessary to rupture a rubber specimen when stretched to the breaking point divided by the original cross sectional area (lb./sq. in.).

Example I

About 100 parts of a polysiloxane gum having a miniature penetrometer reading of about 70 and composed of about 99.6 percent by weight of dimethylsiloxane units and about 0.4 percent by weight of methylvinylsiloxane unit and about 20 parts of an ethoxy end-blocked dimethylpolysiloxane, having an average of one ethoxy group per terminal silicon atom and an average of about 8 dimethylsiloxy units, together with approximately 50 parts of Cab-O-Sil HS-5, a precipitated silica having a nominal particle diameter of about 11 millimicrons and a surface area of about 300 square meters per gram, and about 75 parts of pulverized quartz (Min-U-Sil), an extending filler having a nominal particle diameter of about 3 microns and a surface area of about 1 square meter per gram were added to and compounded on a two roll mill to form a soft, plastic and readily workable polysiloxane composition.

To the polysiloxane composition being milled there was then added a dispersion, prepared by dispersing of 5.2 parts of powdered polytetrafluoroethylene in a small amount of water, and compounding on the mill continued for about ten minutes. During this period modified polysiloxane composition became tough and leather-like, exhibiting considerable structure and difficult to mill. The resulting polytetrafluoroethylene-polysiloxane composition was then removed from the mill and a portion thereof (Sample A) again milled (for a few minutes) with 1.3 parts per 100 parts of the gum of 2,5-dimethyl-2,5-t-butyl peroxy hexane. Dispersion of the catalyst was difficult to carry out. The mixture was (with some difficulty) molded into a slab in accordance with ASTM D-15-62AT and cured for 15 minutes at a temperature of 350° F. with the resulting elastomer tested for hardness, tensile strength, elongation and tear values.

The recipe for Sample A was as follows:

100.0 parts dimethyl-methylvinyl polysiloxane gum
50.0 parts reinforcing silica filler
75.0 parts extending silica filler
20.0 parts ethoxy end-blocked dimethyl polysiloxane oil
5.2 parts powdered polytetrafluoroethylene.

The physical properties of Sample A were as follows:

Hardness, Shore A _____ 72
Tensile, p.s.i. _____ 850
Elongation, percent _____ 340
Tear, Die B, p.p.i. _____ 125

The remaining uncatalyzed portion of the composition was then placed in an intensive mixer (Banbury mixer) and subjected to the shearing action thereof for a prolonged period of about 30 minutes. On examination the composition was found soft and plastic and could be readily formed or shaped.

A portion of the resulting composition (Sample B) was removed from the mixer, catalyzed and molded with ease into a slab in accordance with the procedure described above and tested for physical properties. The following values were noted for Sample B:

Hardness, Shore A _____ 64
Tensile, p.s.i. _____ 890
Elongation, percent _____ 400
Tear, Die B, p.p.i. _____ 110

As can be noted Sample B prepared in accordance with the technique of this invention possesses essentially the same physical properties as that of Sample A while at the same time exhibiting considerable improvement in its physical processing characteristics.

The remaining portion of the polytetrafluoroethylene-polysiloxane gum composition was removed from the intensive mixer and placed on a two roll mill. There was then added an additional 5.2 parts (providing a total of 10.4 parts of polytetrafluoroethylene) per 100 parts of polysiloxane gum of the same polytetrafluoroethylene. Milling was carried out for about one hour and the resulting composition examined and found soft, plastic and readily workable. A portion of this composition (Sample C) was removed, catalyzed and readily molded into a slab in accordance with the procedure described for Sample A above and tested for physical properties. The following values were noted for Sample C:

Hardness, Shore A _____ 64
Tensile, p.s.i. _____ 800
Elongation, percent _____ 430
Tear, Die B, p.p.i. _____ 125

To the composition remaining on the two roll mill there was then added an additional 4.4 parts per 100 parts of the polysiloxane gum of the same polytetrafluoroethylene (providing a total of 14.8 parts of polytetrafluoroethylene per 100 parts of polysiloxane gum), and the mixture milled about one hour. The composition was soft and readily handleable, but had not quite lost all structure. The resulting composition (Sample D) was removed from the mill, catalyzed and readily molded into a slab in accordance with the procedure described for Sample A above and tested for physical properties. The following values were noted:

Hardness, Shore A _____ 72
Tensile, p.s.i. _____ 750
Elongation, percent _____ 450
Tear, Die B, p.p.i. _____ 150

A comparison of the physical properties which characterized Samples B, C and D readily indicates that such properties are of the same magnitude as those heretofore obtainable, while at the same time the compositions from which they were prepared exhibit considerable and remarkable improvements in physical characteristics.

Example II

Additional slabs made from the recipes of Samples A and D were prepared following the procedure set forth in Example I and subjected to a post curing procedure which included the step of heating for a period of four hours at a temperature of 400° F. and the resulting slabs were tested for physical properties and the following values obtained:

|  | Sample A | Sample D |
| --- | --- | --- |
| Hardness, Shore A | 75 | 80 |
| Tensile, p.s.i. | 1040 | 950 |
| Elongation, percent | 210 | 270 |
| Tear, Die B, p.p.i. | 92 | 215 |

It should be noted that a composition prepared in accordance with my invention (Sample D) possesses extremely remarkable tear values upon being post cured.

Example III

Samples of E and F were separately prepared by adding 100 parts of polysiloxane gum composed of about 99.6 percent by weight of dimethylsiloxane units and 0.6 percent by weight methylvinylsiloxane units and having a miniature penetrometer reading of about 70, about 25 parts by weight of an ethoxy end-blocked polysiloxane having an average of one ethoxy group per terminal silicon atom and an average of about 8 dimethylsiloxy units together with approximately 60 parts of Cab-O-Sil HS-5 (a precipitated silica) and about 55 parts of Min-U-Sil (pulverized quartz) to a two roll mill and compounding the mixture to obtain a soft workable composition. To one composition (Sample E) was added 7.5 parts of polytetrafluoroethylene powder and to the other composition (Sample F) was added 11.25 parts of polytetrafluoroethylene powder. Sample E was milled for 115 minutes while Sample F was milled for 140 minutes. The samples were examined and found soft, plastic and readily workable. The samples were then catalyzed with 0.5 part by weight of 2,5-dimethyl-2-5-t-butylperoxyhexane per 100 parts by weight of the composition by a brief milling procedure and cured for twenty minutes at 350° F. followed by a post cure for a period of four hours at a temperature of 480° F. The samples were then tested for physical properties and the values obtained appear in the table below:

|  | Sample E | Sample F |
| --- | --- | --- |
| Hardness, Shore A | 81 | 82 |
| Tensile, p.s.i. | 970 | 930 |
| Elongation, percent | 160 | 140 |
| Tear, Die B, p.p.i. | 140 | 175 |

Example IV

About 100 parts of a polysiloxane gum identified in Example I together with about 45 parts of Cab-O-Sil HS-5 and about 15 parts by weight of the end-blocked dimethylpolysiloxane defined in Example I were added to a two roll mill and compounded into a soft workable composition. There was then added about 7.5 parts by weight of polytetrafluoroethylene powder and milling was continued for a period of over eight hours. During this period the composition was examined at various intervals to determine its physical processing characteristics. At all times during the milling operation the composition was tough and leather-like and extremely difficult to work. The extensive shearing action did not produce a soft, plastic composition in the absence of an extending silica filler. Similarly the absence of an ethoxy or hydroxy end-blocked polysiloxane has a harmful effect on handleability of the composition while the absence of the reinforcing filler markedly decrease the physical properties.

What is claimed is:
1. A composition of matter which comprises:
    (a) a dihydrocarbon substituted polysiloxane gum having a hydrocarbon group to silicon atom ratio of from about 1.95 to about 2.05, said hydrocarbon groups being methyl and vinyl radicals and wherein from 0.037 to 0.7 mole percent of said hydrocarbon groups are vinyl radicals;
    (b) from 2 to 100 parts by weight per 100 parts by weight of said polysiloxane gum of a relatively low molecular weight end-blocked dihydrocarbon polysiloxane having a hydrocarbon group to silicon atom ratio of about 2 and wherein at least one end-blocking group of said polysiloxane is selected from the class consisting of alkoxy and hydroxyl groups and having an average of from about 4 to about 35 dihydrocarbon siloxy groups;
    (c) from about 5 to about 15 parts by weight per 100 parts by weight of said polysiloxane gum of polytetrafluoroethylene;
    (d) at least 10 parts by weight per 100 parts by weight of said polysiloxane gum of a reinforcing silica filler selected from the class consisting of precipitated and fumed silicas having a nominal particle diameter of from about 5 to about 50 millimicrons and a surface area of from about 80 to 600 square meters per gram;
    (e) from 10 to 250 parts by weight per 100 parts by weight of said polysiloxane gum of an extending silica filler having a nominal particle diameter of from about 0.1 to 50 microns and a surface area of less than 30 square meters per gram.
2. A composition as defined in claim 1, wherein the amount of reinforcing silica filler ranges from about 20 to about 75 parts by weight per 100 parts by weight of polysiloxane gum and the amount of extending silica filler ranges from about 30 to about 150 parts by weight per 100 parts by weight of polysiloxane gum.

3. A composition as defined in claim 2, wherein the end-blocked polysiloxane is an ethoxy end-blocked dimethyl polysiloxane having an average of one ethoxy group per terminal silicon atom and wherein the reinforcing silica filler is precipitated silica having a nominal particle diameter of from about 10 to about 20 millimicrons and a surface area of from about 100 to about 350 square meters per gram, and the extending silica filler is pulverized quartz.

4. A composition as defined in claim 2, wherein the end-blocked polysiloxane is a hydroxyl end-blocked dimethylpolysiloxane having an average of one hydroxyl group per terminal silicon atom and wherein the reinforcing silica filler is precipitated silica having a nominal particle diameter of from about 10 to about 20 millimicrons and a surface area of from about 100 to about 350 square meters per gram, and the extending silica filler is pulverized quartz.

5. A composition as defined in claim 3, which contains an organic peroxide curing agent.

6. The cured composition of claim 5.

7. A process for improving the physical properties of a composition as defined in claim 1, comprising subjecting said composition to a shearing action of at least thirty minutes.

8. A process as defined in claim 7, wherein the polytetrafluoroethylene is added to the polysiloxane gum as a dispersion of finely divided particles in water.

9. A process as defined in claim 7 wherein the composition contains as an additional ingredient an organic peroxide catalyst.

References Cited

UNITED STATES PATENTS 3,132,116  5/1964  Wilkus _____ 260—827

FOREIGN PATENTS 576,748  5/1959  Canada.
567,259  12/1958  Canada.
575,889  5/1959  Canada.
866,998  5/1961  Great Britain.

OTHER REFERENCES

Crandell: Rubber World, November 1955, pp. 236–240, 260-827.

MORRIS LIEBMAN, *Primary Examiner.*

L. T. JACOBS, *Assistant Examiner.*

U.S. Cl. X.R.

260—827